Nov. 5, 1957 E. S. BERGLUND 2,811,823
RAKE CLEANING AND ADJUSTING MEANS
Filed Oct. 27, 1954
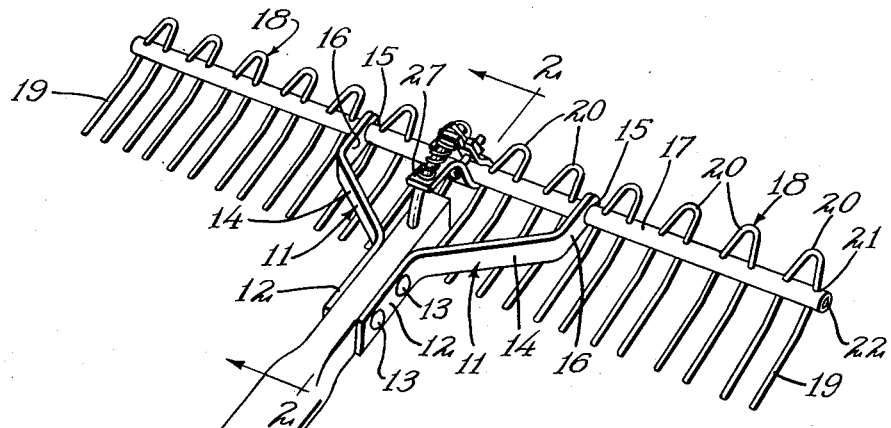
Fig. 1
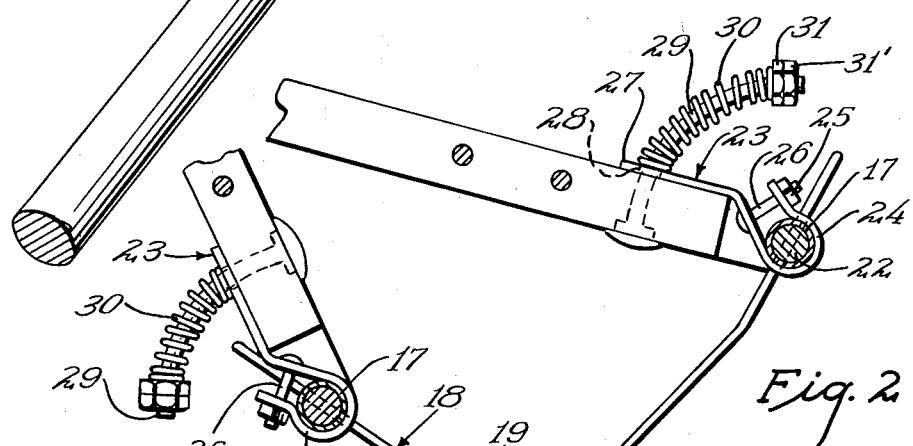
Fig. 2
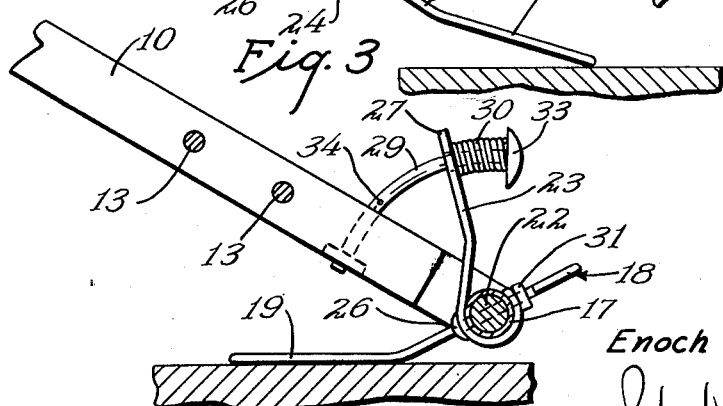
Fig. 3
Fig. 4
INVENTOR
Enoch S. Berglund
BY
ATTORNEY

United States Patent Office 2,811,823
Patented Nov. 5, 1957

2,811,823

RAKE CLEANING AND ADJUSTING MEANS

Enoch S. Berglund, Stillwater, Minn.

Application October 27, 1954, Serial No. 464,944

4 Claims. (Cl. 56—400.2)

This invention relates to a multiple purpose garden type rake and more particularly to a new and useful improvement in a new arrangement or combination of structure which facilitates adjustable handling and cleaning the teeth of a hand type rake.

In rake structures of this character known to applicant it is necessary for the person holding the rake to vary the angle of the handle by holding it higher or lower, depending on the person's height, to properly engage and drag the teeth over the ground. Then it is necessary to lift the rake to clean the teeth by hand. Otherwise with these prior devices different and more complicated structures for folding or stripping the rake teeth may be added still without providing the structure herein disclosed or accomplishing the results.

Accordingly it is an object of this disclosure to provide a new and useful arrangement in a self-cleaning rake.

Another object is to provide a new and useful improvement in a self-cleaning rake in combination with an adjustable mounting for varying the angle of the rake handle with respect to the rake teeth.

Further objects and advantages will be apparent from the following description of the accompanying drawings, wherein:

Figure 1 is a perspective of the rake structure embodied in this disclosure,

Figure 2, an enlarged cross-sectional view on lines 2—2 of Figure 1,

Figure 3, an end view illustrating an operational feature of the structure embodied in Figures 1 and 2, Figure 4, a modification of the structure shown in Figure 2.

With reference to the drawings like parts will be indicated by similar numerals.

The rake structure herein disclosed includes a conventional rake handle 10 provided at its lower end with a pair of strap iron angular brackets 11. The brackets 11 are mounted to the handle at the plate end 12 by conventional screws or bolts or rivets 13. Depending from the plates 12 are the spaced or diverging integral flat plates 14 provided with bearings formed of circular openings 15 in the integral ends 16 of brackets 11.

The circular openings 15 serve as bearings within which the rotatable cross bar 17, preferably rounded, is free to rotate within the limits of the pitch provided by a holding bar, as hereinafter described. The cross bar 17 is provided with a plurality of sets of U-shaped rake teeth 18. As illustrated, the teeth 18 are preferably formed of pointed pairs of cylindrical tines 19 by folding at bends 20 and inserted through pairs of openings 21 in cross bar 17. To be wedged the teeth preferably are drawn or forced through a holding peg 22 or otherwise encasing the teeth 18 in a suitable plastic or welding them to bar 17. The upper bend sections 20 may also be used for raking and leveling ground if desired and the angle of the handle adjusted with respect thereto, as hereinafter described, such angle being for the purpose of having the rake teeth 18 serve as a broom rake among other services.

In order to vary the angle of the rake handle 10 with respect to the rake teeth 19, and correspondingly bent sections 20, and also provide for the feature of cleaning the rake teeth 19, or bends 20 without lifting the rake from the ground, there is clamped on bar 17 a tipping bar member 23. The clamped end 24 of tipping bar 23 encircles the bar 17 and by means of nut 25 on fastening bolt 26 is set tight to hold the bar 17 at any adjusted angle desired permitting the rake to be also handled with the rake and tines 19 reversed and used as a fork, as shown in Figure 3 if desired. As illustrated the cross bar 17 may rotate in the clamp 24 through an arc of almost 360° although a lesser arc, say of from approximately 30° to 90° is usually required for accomplishing the purposes of this disclosure.

The end 27 of tipping bar 23 is provided with hole 28 through which the arcuate guide bolt 29 loosely extends securing the bar 23 to the rake handle 10. The guide bolt 29 has the axis of the cross bar 17 as its center of arcuation. As illustrated, the tension spring 30 mounted about bolt 29 between bar 23 and shoulder nut 31 holds the bar 23 down and the pairs of rake teeth 18 in a pre-adjusted position. The holding tension of spring 30 is variable by adjustment of nut 31 and locking nut 31'. The bolt 29 is illustrated as mounted through handle 10.

By varying the angle of the rake teeth 18 with respect to the handle 10 a tall person or a short person can adjust the rake to the holding height desired. Further by pushing the rake forward with the tines 19 against the ground, the tipping bar 23 moves upon bolt 29 compressing spring 39 and thereby turning tines 19 underneath, as illustrated in Figure 4, allowing them to be cleaned or freed of clogging or gatherings thereon or between the tines 19. By releasing the pushing pressure or pulling the rake, as in its normal operation, the pairs of teeth 18 are erected to the preadjusted operative position.

In the modified structure as provided for in Fig. 4, the fastening bolt 26 may be aligned with a hole centered in cross bar 17. In this arrangement the teeth are set at a pre-adjusted angle which is not variable with respect to holding the rake handle in the normal rake pulling operation. Otherwise the tipping bar 23 is the same and the bolt cap 33 may be replaced with the tension adjusting nut 31 and locking nut 31'. A holding pin aperture 34 is provided in bolt 29 to lock bar 33 in a stationary position, when desired.

In accordance with the patent statutes, I have described the principles of construction and operation of my multiple purpose rake with the new and useful improvements therein, and while I have endeavored to set forth the best embodiment thereof, I desire to have it understood that obvious changes may be made within the scope of the following claims without departing from the spirit of my invention.

I claim:

1. A hand rake including an elongated handle, a cross bar pivotally supported by said handle on an axis at substantially right angles to the handle axis, an arcuate guide attached at one end to said handle and having the cross bar axis as its center of curvature, a member secured at one end to said cross bar for rotation therewith, said member being apertured to accommodate said arcuate guide extending therethrough, a shoulder on said arcuate guide adjacent the other end thereof, and resilient means interposed between said shoulder and said member to bias said member toward the end of said arcuate guide secured to said handle, and rake teeth secured to said cross bar to project therefrom, whereby force against said rake teeth from one side thereof and in one direction may act through said member to flex said resilient means to permit rotation of said cross bar and rake teeth relative to said handle.

2. The structure of claim 1 and in which said cross bar may be supported with said teeth extending on a plane at an acute angle to a plane through the cross bar axis and parallel to said handle axis, and in which the flexing of said resilient means acts to reduce the said angle.

3. The structure of claim 1 and including an adjustable connection between said member and said cross bar, whereby the normal position of the rake teeth may be adjusted without affecting the ability of the cross bar to pivot about its axis.

4. The structure of claim 1 and in which the rake teeth comprise U-shaped members, the teeth of which extend through the cross bar.

References Cited in the file of this patent

UNITED STATES PATENTS

| | | |
|---|---|---|
| 617,206 | Tveit et al. | Jan. 3, 1899 |
| 1,123,682 | Carroll | Jan. 5, 1915 |
| 1,548,906 | Schroer | Aug. 11, 1925 |
| 2,343,033 | Swanson | Feb. 29, 1944 |